United States Patent [19]
DePietro et al.

[11] Patent Number: 5,588,907
[45] Date of Patent: Dec. 31, 1996

[54] PORTABLE GAME HOIST

[76] Inventors: Richard P. DePietro, 301 Mountain Rd., Boyertown, Pa. 19512; Brian J. Wilkinson, 27 Longview Rd., Birdsboro, Pa. 19508

[21] Appl. No.: 577,090

[22] Filed: Dec. 22, 1995

[51] Int. Cl.⁶ ............................... A22B 5/00; A22B 5/16
[52] U.S. Cl. .................... 452/187; 452/189; 452/125
[58] Field of Search .................... 452/187, 125, 452/128, 185, 189, 190, 191, 192

[56] References Cited

U.S. PATENT DOCUMENTS

| | | | |
|---|---|---|---|
| 4,860,404 | 8/1989 | Flachs | 452/187 |
| 4,903,372 | 2/1990 | Jones | 452/187 |
| 5,049,110 | 9/1991 | Owens | 452/189 |
| 5,211,601 | 5/1993 | Cope | 452/187 |
| 5,336,124 | 8/1994 | Garside | 452/187 |
| 5,395,284 | 3/1995 | Frisk | 452/187 |
| 5,417,609 | 5/1995 | Oldham | 452/189 |
| 5,482,501 | 1/1996 | Frits | 452/187 |

Primary Examiner—Willis Little

[57] ABSTRACT

A portable game hoist for hanging game or other objects from an existing support structure. The inventive device includes a main beam which can be rested upon or secured relative to a support structure such as spaced rafters or a vertical support. A winch is secured relative to a first end of the main beam and stores a cable which is directed through the main beam to a second end thereof. The cable extends over a pulley at the second end of the main beam and couples with a hanger so as to permit hanging of game animals or the like relative to the support structure.

14 Claims, 3 Drawing Sheets

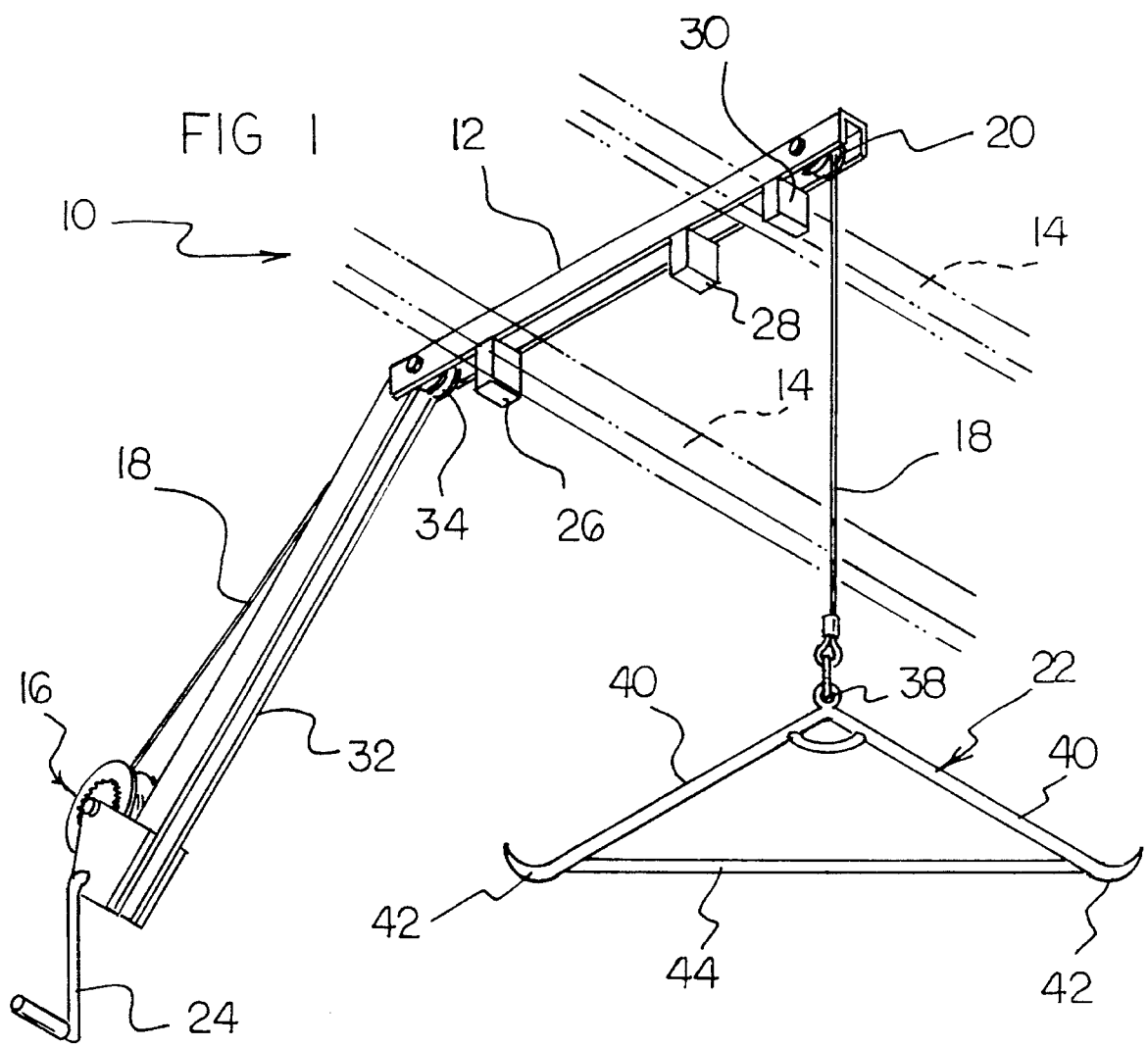
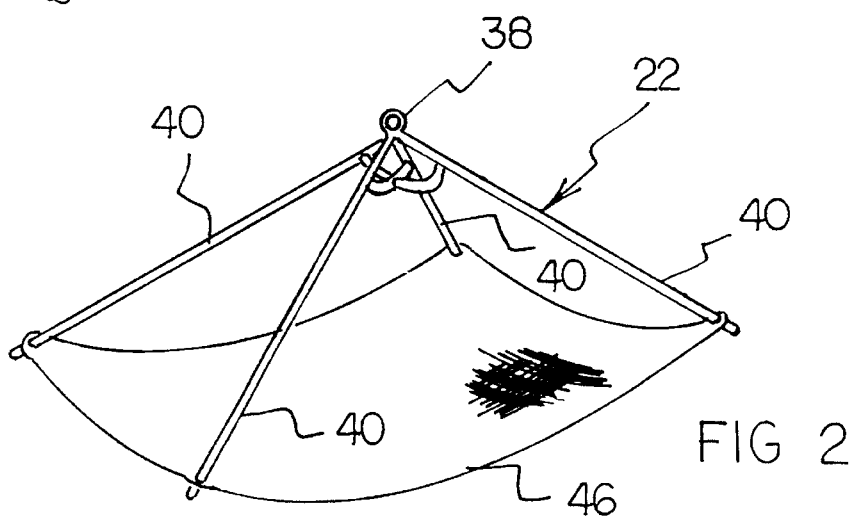

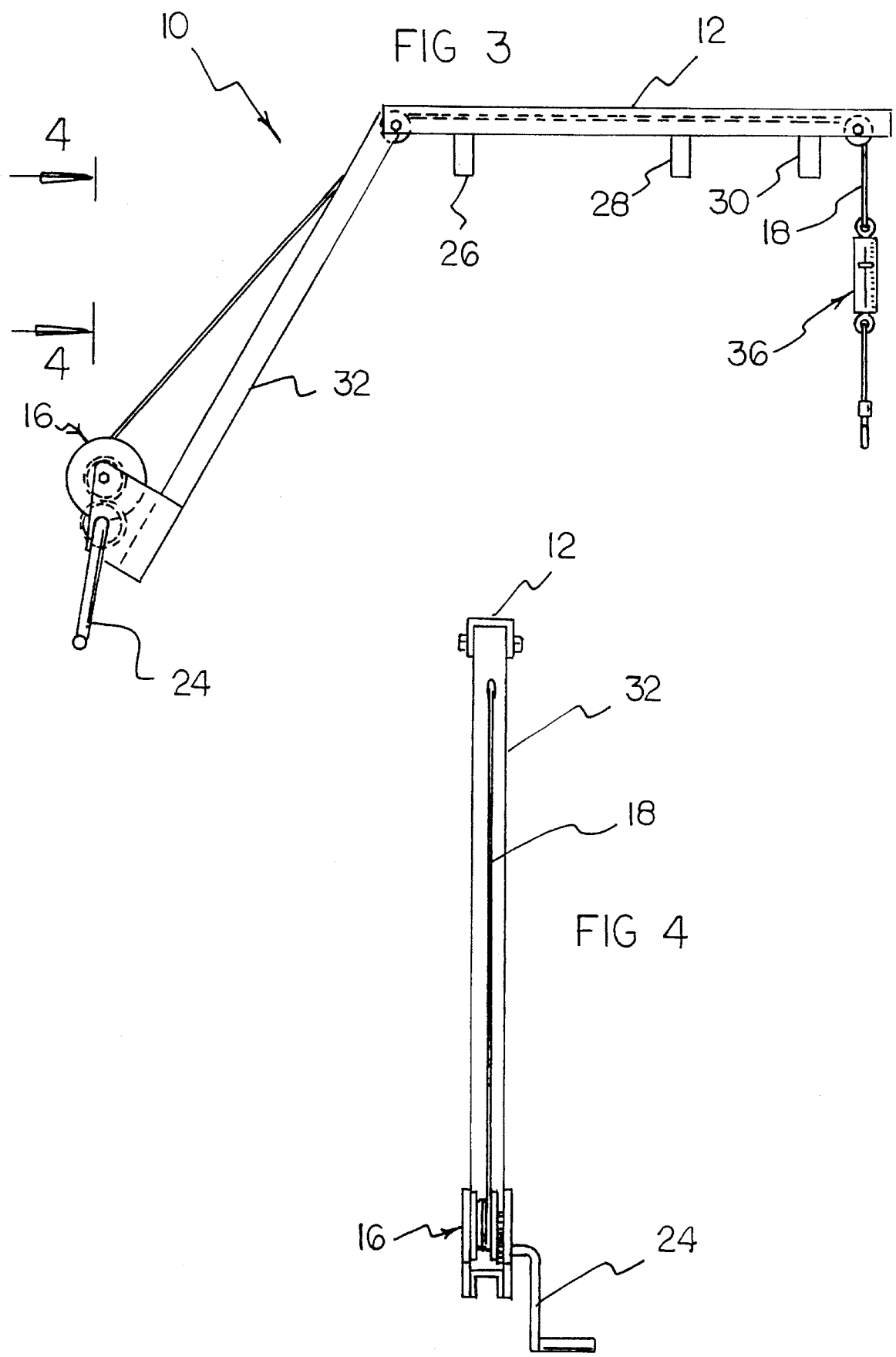

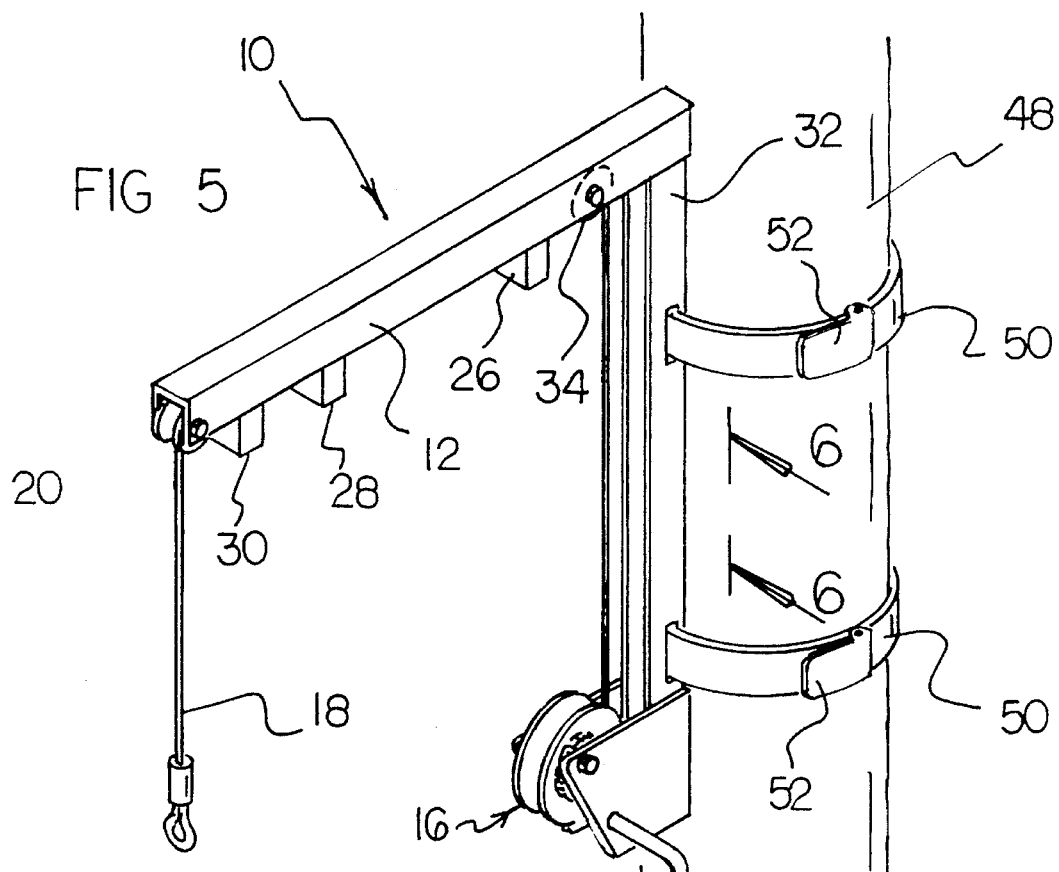
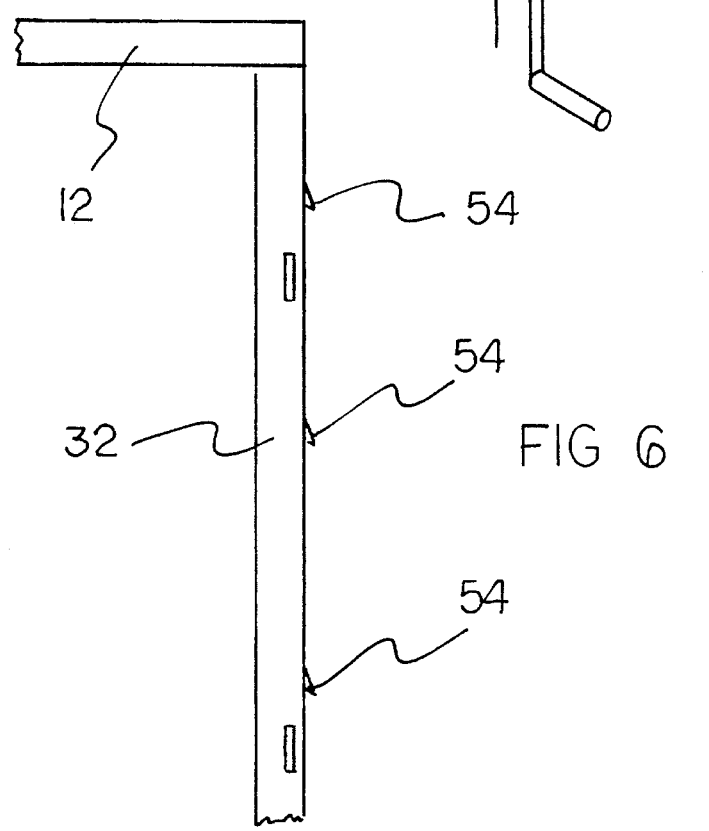

PORTABLE GAME HOIST

BACKGROUND OF THE INVENTION

1. Field of the Invention

The present invention relates to hoisting devices and more particularly pertains to a portable game hoist for hanging game or other objects from an existing support structure.

2. Description of the Prior Art

The use of hoisting devices is known in the prior art. More specifically, hoisting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art hoisting devices include U.S. Pat. No. 5,236,386; U.S. Pat. No. 5,211,601; U.S. Pat. No. 4,580,317; U.S. Pat. No. 4,290,504; U.S. Pat. No. 5,145,224; and U.S. Design Patent U.S. Pat. No. 334,532.

While these devices fulfill their respective, particular objectives and requirements, the aforementioned patents do not disclose a portable game hoist for hanging game or other objects from an existing support structure which includes a main beam which can be rested upon or secured relative to the support structure, a winch secured relative to a first end of the main beam and storing a cable which directed through the main beam to a second end thereof, the cable extending over a pulley at the second end of the main beam and coupling with a hanger so as to permit hanging of game animals or the like relative to the support structure.

In these respects, the portable game hoist according to the present invention substantially departs from the conventional concepts and designs of the prior art, and in so doing provides an apparatus primarily developed for the purpose of hanging game or other objects from an existing support structure.

SUMMARY OF THE INVENTION

In view of the foregoing disadvantages inherent in the known types of hoisting devices now present in the prior art, the present invention provides a new portable game hoist construction wherein the same can be utilized for hanging game or other objects from an existing support structure. As such, the general purpose of the present invention, which will be described subsequently in greater detail, is to provide a new portable game hoist apparatus and method which has many of the advantages of the hoisting devices mentioned heretofore and many novel features that result in a portable game hoist which is not anticipated, rendered obvious, suggested, or even implied by any of the prior art hoisting devices, either alone or in any combination thereof.

To attain this, the present invention generally comprises a portable game hoist for hanging game or other objects from an existing support structure. The inventive device includes a main beam which can be rested upon or secured relative to a support structure such as spaced rafters or a vertical support. A winch is secured relative to a first end of the main beam and stores a cable which is directed through the main beam to a second end thereof. The cable extends over a pulley at the second end of the main beam and couples with a hanger so as to permit hanging of game animals or the like relative to the support structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable game hoist apparatus and method which has many of the advantages of the hoisting devices mentioned heretofore and many novel features that result in a portable game hoist which is not anticipated, rendered obvious, suggested, or even implied by any of the prior art hoisting devices, either alone or in any combination thereof.

It is another object of the present invention to provide a new portable game hoist which may be easily and efficiently manufactured and marketed.

It is a further object of the present invention to provide a new portable game hoist which is of a durable and reliable construction.

An even further object of the present invention is to provide a new portable game hoist which is susceptible of a low cost of manufacture with regard to both materials and labor, and which accordingly is then susceptible of low prices of sale to the consuming public, thereby making such portable game hoists economically available to the buying public.

Still yet another object of the present invention is to provide a new portable game hoist which provides in the apparatuses and methods of the prior art some of the advantages thereof, while simultaneously overcoming some of the disadvantages normally associated therewith.

Still another object of the present invention is to provide a new portable game hoist for hanging game or other objects from an existing support structure.

Yet another object of the present invention is to provide a new portable game hoist which includes a main beam which can be rested upon or secured relative to the support structure, a winch secured relative to a first end of the main beam and storing a cable which directed through the main beam to a second end thereof, the cable extending over a pulley at the second end of the main beam and coupling with a hanger so as to permit hanging of game animals or the like relative to the support structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the portable game hoist constructed in accordance with the principles of the present invention.

FIG. 2 is an isometric illustration of an alternative form of a hanger of the present invention.

FIG. 3 is a side elevational view of the invention.

FIG. 4 is a rear elevational view of the invention as taken from line 4—4 of FIG. 3.

FIG. 5 is a perspective illustration of an alternative form of the portable game hoist.

FIG. 6 is a side elevational view of the alternative form of the invention taken from line 6—6 of FIG. 5.

Similar reference characters refer to similar parts throughout the several views of the drawings.

DESCRIPTION OF THE PREFERRED EMBODIMENT

With reference now to the drawings, and in particular to FIGS. 1–6 thereof, a new portable game hoist embodying the principles and concepts of the present invention and generally designated by the reference numeral 10 will be described.

More specifically, it will be noted that the portable game hoist 10 comprises a main beam 12 which can be rested upon or secured relative to a support structure such as the spaced rafters 14 shown in FIG. 1 of the drawings. A winch 16 is secured relative to a first end of the main beam 12 and stores a cable 18 which is directed through the main beam to a second end thereof. The cable 18 extends over an outer pulley 20 which is rotatably mounted at the second end of the main beam 12. The cable 18 depends from the outer pulley 20 and couples with a hanger 22. By this structure, the main beam can be placed across one of more rafters, a game carcass or the like can be engaged with hanger 22, and the winch 16 can be manually operated through a crank 24 to hoist the game carcass above the ground for a butchering or like procedure.

As shown in FIGS. 1, 3, and 4, the invention 10 preferably further includes a plurality of abutment members which operate to engage the rafters 14 of the support structure to preclude sliding of the main beam relative thereto. To this end, an inner abutment member 26 is mounted proximal to the first end of the main beam 12 and cooperates with first or second outer abutment members 28 and 30 to capture one or more rafters 14 therebetween. Specifically, the first outer abutment member 28 is located a first distance from the inner abutment member 26 so as to capture a plurality of rafters 14 spaced a first distance apart. Similarly, the second outer abutment member 30 is located a second distance from the inner abutment member 26 so as to capture a plurality of rafters 14 spaced a second distance apart, wherein the second distance is substantially greater than the first distance. By this structure, rafters 14 of various spacings therebetween can be securely captured and abuttingly positioned against and between the abutment members 26–30.

With continuing reference to FIGS. 1, 3, and 4, it can be shown that the winch 16 is preferably mounted to the first end of the main beam 12 by a winch beam 32 mounted to the first end of the main beam 12. The winch beam 32 can be pivotally coupled to the first end of the main beam 12, or alternatively can be fixed thereto at a desired angle by welding or the like. The winch 16 is mounted to a lower end of the winch beam 32 so as to be within the reach of an individual utilizing the device 10 when it is mounted relative to the rafters 14 shown in FIG. 1. To guide the cable 18 into the main beam 12, an inner pulley 34 can be mounted relative to the main beam 12 proximal to a juncture of the main beam 12 and the winch beam 32. As shown in FIG. 3, the invention 10 may also include a scale means 36 interposed between the cable 18 and the hanger 22 for permitting measurement of the weight of an object hung from the hanger. The scale means 36 can comprise any conventionally known scale such as the spring scale illustrated herein.

As shown in FIG. 1, the hanger 22 preferably comprises an eye 38 secured to an end of the cable 18. A pair of lateral bars 40 extend in opposed directions from the eye 38 and terminate in outer distal ends. An exterior hook 42 extends from the outer distal ends of each of the lateral bars 40 for engaging an object to be hung. A cross bar 44 can extend between the lateral bars 40 to stabilize the lateral bars relative to one another and to permit for further securing of objects to the hanger. As shown in FIG. 2, an alternative form of the hanger 22 includes three or more lateral bars 40 extending from the eye 38 with a center web 46 extending between distal ends of the lateral bars to form a supporting surface or cradle within which objects can be placed. By this structure, either of the forms of the hanger 22 can be utilized to support or hang objects from cable 18.

Turning now to FIGS. 5 and 6, it can be shown that an alternative form of the invention may be configured for securing to a vertical support 48 such as a tree or a pole. To this end, a plurality of securing straps 50 are secured to the winch beam 32 and can be extended about the vertical support 48 to couple the winch beam 32 and attached main beam 12 relative thereto. Each of the securing straps 50 includes an adjustable buckle 52 of conventionally known design permitting adjustment of the straps 50 to a desired circumference of vertical support 48. As shown in FIG. 6, the winch beam 32 can include a plurality of engaging spikes 54 projecting therefrom which serve to engage a tree of other vertical support 48 to preclude slipping of the invention 10 down the tree.

In use, the portable game hoist 10 of the present invention 10 can be easily utilized for hanging game or other objects from an existing support structure. To this end, the device 10 can be secured to a support structure such as rafters or to a tree. An object can then be hung from the hanger 22 and the winch can be manually operated to hoist the object from the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable game hoist comprising:
   a main beam which can be secured relative to a support structure;
   a winch secured relative to a first end of the main beam and storing a cable directed through the main beam to a second end of the main beam;
   an outer pulley rotatably mounted at the second end of the main beam, the cable extending over the main beam and depending therefrom for coupling to an object; and
   a plurality of abutment members being mounted to the main beam which operate to engage at least one rafter to preclude sliding of the main beam relative thereto with the main beam being placed across the at least one rafter of a support structure.

2. The portable game hoist of claim 1, wherein the abutment members include an inner abutment member mounted proximal to the first end of the main beam; and first and second outer abutment members mounted to the main beam and spaced from the inner abutment member.

3. The portable game hoist of claim 2, wherein the first outer abutment member is mounted a first distance from the inner abutment member so as to capture a plurality of rafters spaced a first distance apart between the first outer abutment member and the inner abutment member; and further wherein the second outer abutment member is mounted a second distance from the inner abutment member so as to capture a plurality of rafters spaced a second distance apart between the second outer abutment member and the inner abutment member, wherein the second distance is substantially greater than the first distance.

4. The portable game hoist of claim 3, wherein the winch is mounted relative to the first end of the main beam by a winch beam mounted to the first end of the main beam, the winch being mounted to a lower end of the winch beam; and further comprising an inner pulley mounted relative to the main beam proximal to a juncture of the main beam and the winch beam, with the cable extending over the inner pulley.

5. The portable game hoist of claim 4, and further comprising a hanger coupled to the cable.

6. The portable game hoist of claim 5, wherein the hanger comprises an eye secured to an end of the cable; a pair of lateral bars extending in opposed directions from the eye and terminating in outer distal ends; and exterior hooks extending from the outer distal ends of the lateral bars.

7. The portable game hoist of claim 5, wherein the hanger comprises an eye secured to an end of the cable; a plurality of lateral bars extending in opposed directions from the eye and terminating in outer distal ends; and a center web extending between distal ends of the lateral bars to form a cradle within which objects can be placed.

8. A portable game hoist comprising:
   a main beam which can be secured relative to a support structure;
   a winch secured relative to a first end of the main beam and storing a cable directed through the main beam to a second end of the main beam;
   an outer pulley rotatably mounted at the second end of the main beam, the cable extending over the main beam and depending therefrom for coupling to an object;
   a plurality of securing straps secured to the winch beam and being extended about a vertical support to couple the winch beam and main beam relative thereto, each of the securing straps including an adjustable buckle.

9. The portable game hoist of claim 8, and further comprising a plurality of engaging spikes projecting from the winch beam.

10. The portable game hoist of claim 9, and further comprising a hanger coupled to the cable.

11. The portable game hoist of claim 10, wherein the hanger comprises an eye secured to an end of the cable; a pair of lateral bars extending in opposed directions from the eye and terminating in outer distal ends; and exterior hooks extending from the outer distal ends of the lateral bars.

12. The portable game hoist of claim 10, wherein the hanger comprises an eye secured to an end of the cable; a plurality of lateral bars extending in opposed directions from the eye and terminating in outer distal ends; and a center web extending between distal ends of the lateral bars to form a cradle within which objects can be placed.

13. In combination, a portable game hoist and
   a support structure including a plurality of spaced rafters; said portable game hoist comprising:
   a main beam positioned over at least two of the rafters;
   a winch secured relative to a first end of the main beam and storing a cable directed through the main beam to a second end of the main beam;
   an outer pulley rotatably mounted at the second end of the main beam, the cable extending over the main beam and depending therefrom;
   a hanger having a pair of lateral bars and coupled to the cable; and
   a plurality of abutment members mounted to the main beam which engage at least one of the rafters to preclude sliding of the main beam relative thereto.

14. The portable game hoist of claim 13, wherein the hanger comprises an eye secured to an end of the cable; the pair of lateral bars extending in opposed directions from the eye and terminating in outer distal ends; and exterior hooks extending from the outer distal ends of the lateral bars.

* * * * *